US011235198B2

(12) United States Patent
Bacanovic

(10) Patent No.: US 11,235,198 B2
(45) Date of Patent: Feb. 1, 2022

(54) STATIONARY ERGOMETRIC EXERCISE DEVICE

(71) Applicant: Wattbike IP Limited, Nottingham (GB)

(72) Inventor: Milan Bacanovic, Vienna (AT)

(73) Assignee: Wattbike IP Limited, Nottingham (GB)

( * ) Notice: Subject to any disclaimer, the term of this patent is extended or adjusted under 35 U.S.C. 154(b) by 6 days.

(21) Appl. No.: 16/069,229

(22) PCT Filed: Jan. 11, 2017

(86) PCT No.: PCT/GB2017/050062
§ 371 (c)(1),
(2) Date: Jul. 11, 2018

(87) PCT Pub. No.: WO2017/122007
PCT Pub. Date: Jul. 20, 2017

(65) Prior Publication Data
US 2019/0046834 A1  Feb. 14, 2019

(30) Foreign Application Priority Data

Jan. 11, 2016 (GB) ..................................... 1600466

(51) Int. Cl.
*A63B 22/06* (2006.01)
*A63B 21/005* (2006.01)
(Continued)

(52) U.S. Cl.
CPC ...... *A63B 22/0605* (2013.01); *A63B 21/0051* (2013.01); *A63B 21/225* (2013.01);
(Continued)

(58) Field of Classification Search
CPC .............. A63B 21/0051; A63B 21/225; A63B 22/0605; A63B 24/0087; A63B 2209/08; A63B 2024/0093
See application file for complete search history.

(56) References Cited

U.S. PATENT DOCUMENTS 4,938,475 A * 7/1990 Sargeant ............ A63B 21/0053
  482/9
8,641,581 B2 * 2/2014 Bacanovic ............. A63B 24/00
  482/57

(Continued)

FOREIGN PATENT DOCUMENTS

CN  1037280     11/1989
CN  1417081 A    5/2003
(Continued)

OTHER PUBLICATIONS

International Search Report and Written Opinion dated Mar. 5, 2017 for PCT/GB2017/050062.

(Continued)

*Primary Examiner* — Jennifer Robertson
*Assistant Examiner* — Catrina A Letterman
(74) *Attorney, Agent, or Firm* — Renner, Otto, Boisselle & Sklar, LLP

(57) ABSTRACT

A stationary exercise device comprises pedals mounted via cranks to opposite sides of a drive wheel; a flywheel with a magnetic rim coupled to the drive wheel; a brake with a motor and one or more permanent magnets mounted for movement relative to the magnetic rim; a measuring unit for measuring at least one of the drive force applied via the drive wheel and the related torque; a measuring device for measuring cadence; and a command module. The command module uses measurements from the measuring unit and the measuring device to calculate a performance parameter and compares the performance parameter against a predeter- (Continued)

mined performance profile. The command module also can control the motor to move the permanent magnets relative to the magnetic rim to adjust the braking force applied and thereby adjust the performance parameter to conform with the performance profile.

21 Claims, 5 Drawing Sheets

(51) Int. Cl.
    *A63B 21/22*     (2006.01)
    *A63B 24/00*     (2006.01)
    *A63B 71/06*     (2006.01)
    *H04M 1/72412*     (2021.01)

(52) U.S. Cl.
    CPC .... *A63B 24/0087* (2013.01); *A63B 2024/009* (2013.01); *A63B 2024/0078* (2013.01); *A63B 2024/0093* (2013.01); *A63B 2071/0638* (2013.01); *A63B 2071/0652* (2013.01); *A63B 2071/0683* (2013.01); *A63B 2209/08* (2013.01); *A63B 2220/34* (2013.01); *A63B 2220/54* (2013.01); *A63B 2220/76* (2013.01); *A63B 2220/89* (2013.01); *A63B 2225/50* (2013.01); *H04M 1/72412* (2021.01); *H04M 2250/02* (2013.01)

(56) References Cited

U.S. PATENT DOCUMENTS

| | | | |
|---|---|---|---|
| 9,468,794 B2 * | 10/2016 | Barton | A63B 21/0058 |
| 2003/0073546 A1 | 4/2003 | Lassanske et al. | |
| 2006/0003872 A1 | 1/2006 | Chiles | |
| 2008/0103030 A1 * | 5/2008 | Watson | A63B 22/0605 |
| | | | 482/61 |
| 2010/0035726 A1 | 2/2010 | Fisher | |
| 2010/0234185 A1 | 9/2010 | Watt et al. | |
| 2011/0111923 A1 | 5/2011 | Bacanovic | |
| 2013/0210582 A1 | 8/2013 | Del Toro | |
| 2014/0106936 A1 | 4/2014 | Puerschel | |
| 2016/0325146 A1 * | 11/2016 | Shin | A63B 22/0605 |
| 2018/0236290 A1 * | 8/2018 | Andersen | A63B 22/0046 |
| 2019/0275374 A1 * | 9/2019 | Smits | A63B 22/0605 |

FOREIGN PATENT DOCUMENTS

| | | |
|---|---|---|
| CN | 2675543 | 2/2005 |
| CN | 1958388 | 5/2007 |
| CN | 101365516 | 2/2009 |
| CN | 1018421384 | 9/2010 |
| CN | 102363068 | 2/2012 |
| CN | 104884137 | 9/2015 |
| EP | 0323056 | 7/1989 |
| EP | 2183034 B1 | 5/2010 |
| JP | 2003231491 | 8/2003 |
| TW | M295528 U | 8/2006 |
| TW | I369224 B | 8/2012 |
| TW | D163790 S | 10/2014 |
| TW | D167127 S | 10/2015 |
| WO | 2006102529 A2 | 9/2006 |
| WO | 2012042092 A1 | 4/2012 |
| WO | 2015/034265 | 3/2015 |
| WO | 2015034265 A1 | 3/2015 |

OTHER PUBLICATIONS

ProForm; ProForm TDF 5.0 Cycle; found at https://www.proformfitness.co.uk/exercise-bike/tour-de-france-series/proform-tdf-pro-50; available from Aug. 15, 2019.

Chinese Search Report issued by CNIPA for corresponding Chinese patent application No. 201780012248.1 dated Jan. 7, 2020.

* cited by examiner

STATIONARY ERGOMETRIC EXERCISE DEVICE

This application is a national phase of International Application No. PCT/GB2017/050062, filed Jan. 11, 2017, and published in the English language, which claims priority to United Kingdom Patent Application No. 1600466.5, filed Jan. 11, 2016, both of which are hereby incorporated herein by reference.

FIELD OF THE INVENTION

The invention relates to a stationary ergometric exercise device.

SUMMARY

The invention also relates to a method of operating a stationary ergometric exercise device and to a computer program or computer program product.

According to a first aspect of the invention there is provided a stationary ergometric exercise device comprising:
  a foot-operable drive including alternately operable drive elements in the form of foot-driven pedals mounted via pedal cranks to opposite sides of a drive wheel;
  a flywheel coupled to the drive wheel via a gear mechanism, the flywheel including a magnetic rim;
  a brake device in the form of one or more permanent magnets mounted for movement by means of a motor towards and away from the magnetic rim of the flywheel so as to selectively adjust a braking force applied to the flywheel by means of the one or more permanent magnets;
  a measuring unit for measuring, in use, at least one of the drive force applied via the drive and the torque related to it;
  a measuring device for measuring, in use, cadence;
  a command module connected to the measuring unit, the measuring device and the motor of the brake device; and
  a communications module connected to the command module and configured to receive command signals and transmit those command signals to the command module and configured to transmit feedback signals received from the command module reporting user performance,
  wherein the command module is configured to receive measurements from the measuring unit and the measuring device and to use those measurements to calculate one or more performance parameters and to compare the one or more performance parameters against a predetermined performance profile and to control the motor so as to move the one or more permanent magnets relative to the magnetic rim of the flywheel in order to adjust the braking force applied by the one or more permanent magnets and thereby tune the measurements received from the measuring unit and the measuring device so as to adjust the one or more performance parameters calculated by the command module to conform with the predetermined performance profile.

In the context of the invention, the term "cadence" is intended to refer to the rate of pedalling of a user, which is usually calculated in terms of the number of revolutions of the pedal cranks per minute.

It will be appreciated that the provision of a brake device including one or more permanent magnets movable relative to a magnetic rim of a flywheel provides a mechanism whereby it is possible to apply a force aimed at resisting rotation of the flywheel. Whilst the size of the magnetic force provided by the one or more permanent magnets remains constant, the ability to move the one or more permanent magnets towards and away from the flywheel enables the size of the braking force applied to the flywheel and thus the force resisting rotation of the flywheel to be varied and adjusted.

The use of a motor to drive movement of the one or more permanent magnets relative to the magnetic rim of the flywheel facilitates remote operation of the brake device and eliminates the need for a user to manually adjust the position of the one or more permanent magnets relative to the magnetic rim of the flywheel. This in turn allows the size of the braking force applied to the flywheel to be varied and adjusted immediately in response to measurements from the measuring unit and the measuring device, and allows regular adjustments of the position of the brake device relative to the magnetic rim of the flywheel during use of the stationary ergometric exercise device.

The use of one or more permanent magnets is particularly advantageous in that the applicant has discovered that the size of the magnetic force available from a permanent magnet per unit mass is significantly greater than can be achieved through the use of an electro-magnet.

Accordingly, it is readily possible to increase the size of the magnetic force available from the brake device by including additional permanent magnets that are relatively small in size. This in turn greatly increases the flexibility of the resultant braking arrangement in that it allows the creation of a much greater range of braking force available from the interaction between the brake device and the magnetic rim of the flywheel. This in turn means that the use of one or more permanent magnets allows the creation of an arrangement that is more powerful, and is lighter, than can be achieved through the use of an electro-magnet.

The use of one or more permanent magnets also reduces the power consumption required by the device when compared with a braking arrangement involving the use of an electro-magnet. The total power required by the motor, the command module and the communications module is such that the stationary ergometric exercise device may be powered by means of a battery as opposed to a larger power source, such as a mains power outlet, which would almost certainly be required in order to power a device utilising an electro-magnet capable of producing the same range of braking force.

The provision of a command module configured in the manner outlined above also allows a user to set a predetermined performance profile for a particular training or exercise program. The command module in turn collects and compares real-time data against the predetermined performance profile and controls the motor to adjust the braking force applied to the flywheel so as to affect the resistance to rotation of the flywheel, and thus resistance to pedalling, experienced by a user in real time. As outlined above, by appropriate adjustment of the position of the brake device relative to the magnetic rim of the flywheel, the command module is able to tune the measurements received from the measuring unit and the measuring device so as to adjust the one or more performance parameters calculated by the command module to conform with the predetermined performance profile.

In its simplest form, the predetermined performance profile may be set to ensure that a user operates the device at a constant power output. This may be achieved by using the cadence and force and/or torque measurements to calculate the actual power output of the user, comparing the calculated power against the set power output value and controlling the motor so as to increase or decrease the braking force so as to require the user to apply a greater or lower force to the pedals in order to achieve the required power output at the same cadence.

In such a mode of operation, the command module may adjust the braking force as the user's cadence changes in order to increase or decrease the braking force applied to the magnetic flywheel and thereby require the user to increase or decrease the drive force applied to the pedals in order to maintain the same power output.

The ability on the part of the command module to monitor the performance of the user by reference to the measurements obtained from the measuring device and the measuring unit means that the command module is able to re-adjust the position of the brake device relative to the magnetic rim of the flywheel during continued operation of the exercise device with a view to creating a braking force that allows the user to achieve the required power output at a comfortable cadence.

The ability to control the power output of a user can be particularly beneficial for medical and laboratory purposes in assessments where the primary importance is for the user to produce a constant power output and the cadence and/or force applied to the pedals is of a lower importance for the purposes of completing the assessment.

It will be appreciated that the predetermined performance profile may be tailored to create various effects. For example, in another mode of operation, the performance profile may be set so as to define a relationship between power output and cadence for a particular gear. This would result in a curvilinear relationship between the power output and cadence.

In such a mode of operation, the command module may again use the cadence and force and/or torque measurements to calculate the actual power output of the user and to then compare those values against a particular curvilinear relationship between the power output and cadence. The command module may then operate the motor so as to move the brake device towards or away from the magnetic rim of the flywheel so as to increase or reduce the braking force and thereby reduce or increase accordingly the force required from the user to maintain the cadence and thereby achieve the power output corresponding to that cadence on the predetermined performance profile.

The provision of a communications module connected to the command module and configured to receive command signals and to transmit feedback signals reporting user performance allows the stationary ergometric exercise device to be connected to an external device for the purposes of providing a user interface.

It is envisaged, for example, that the communications module could be connected to a smart phone, tablet, smart watch or other computing device running an application configured to communicate with the communications module and thereby allow a user to input data for the purposes of creating a predetermined performance profile. It could also be connected to such a device to allow the creation of a visualisation of the feedback signals on a screen of the device. The interface could, for example, display the cadence and/or force measurements. It could also or alternatively display one or more performance parameters calculated by the command module from the measurements obtained from the measuring device and the measuring unit.

In order to ensure accurate and real time measurements, the measuring unit may be configured to continuously measure, in use, at least one of the drive force applied via the drive and the torque related to it. By continuous, it is envisaged that the measuring unit might measure the force applied via the drive and/or the torque related to it up to 100 times per second.

In such embodiments, such continuous monitoring of the drive force and/or torque related to it allows the command module to continuously re-calculate the one or more performance parameters for comparison with the predetermined performance profile. Accordingly, the command module may control the motor so as to allow continue adjustment of the braking force applied by the brake device.

In embodiments where the command module is configured to calculate the power output of a user, the command unit may be configured to calculate the power output of a user once per revolution of the pedal cranks. In such embodiments, the command module may calculate power on the basis that:

$$power = force \times speed$$

This allows the command module to control the motor to adjust movement of the one or more permanent magnets in a dynamic and responsive manner.

In calculating power, the command module may calculate speed by reference to the measured cadence and the distance travelled per revolution of the pedal cranks. The distance travelled per revolution of the pedal cranks may be pre-set within the command module according to a series of pre-set gears. In such embodiments, the command module may be configured to increase the braking force applied to the flywheel on selection by a user of a higher gear, and vice versa, in order to simulate the additional resistance that would be experienced by a cyclist on changing gear on a real bicycle.

Similarly, the command module may be configured to increase the distance travelled per revolution of the pedal cranks incrementally with each gear from the lowest gear up to the highest gear, and vice versa.

In a particularly preferred embodiment, the distance travelled per revolution increases incrementally from a minimum of 2.790 m in a bottom gear, gear 1, to a maximum of 10.258 m in a top gear, gear 22. In such an embodiment, it will be appreciated that a user operating the exercise device in gear 1 at a cadence of 60 revolutions per minute would equate to a speed of 2.790 $ms^{-1}$ In order to allow a user to change up and down through gears, the exercise device may include buttons included on handlebars so as to allow the user readily to move up and down through the gears as if they were riding a real bicycle. Such buttons may be connected directly to the command module in order to provide the required signal. Alternatively, the buttons may be configured to send command signals to the communications module for onward transmission to the command module.

In rudimentary embodiments of the invention it is envisaged that the command module may be programmed to include a series of predetermined performance profiles from which a user might select before commencing a training program. In particularly preferred embodiments however it is envisaged that the command module may be configured to calculate the predetermined performance profile on receipt of performance characteristic data in the form of command signals from the communications module.

For example, in such embodiments, a user may input a series of cycling parameters that are in turn communicated to the command module via the communications module and allow the command module to calculate a tailor-made predetermined performance profile based on the selected cycling parameters.

It is envisaged that the performance characteristic data may include information concerning one or more static cycling parameters selected from the group consisting of angle of inclination of cycling surface, rolling resistance between bicycle tyre and cycling surface, mass of cyclist, mass of bicycle and cyclist power output.

It is also envisaged that the performance characteristic data may include information concerning one or more dynamic cycling parameters selected from the group consisting of air resistance created by changes in wind speed, air resistance created by changes in altitude and air resistance created through the use of a fan.

In such embodiments, the command module may be configured to calculate the effects of any selected cycling parameters on the drag force that a cyclist would experience riding a bicycle under those conditions and to calculate a predetermined performance profile taking into account the additional drag force. The command module could, for example, generate a predetermined performance profile based on power output versus cadence calculated to take account of the drag force that would be experienced as a result of the selected cycling parameters. This would allow the command module to control the motor and thereby control movement of the brake device relative to the magnetic rim of the flywheel so as to create the required drag force and thereby simulate various cycling conditions.

It will be appreciated that by appropriate selection of cycling parameters a user could create command signals instructing the command module to simulate an infinite number of combinations of cycling conditions. For example, the command module could simulate a light cyclist riding a light bicycle on a velodrome surface; the same cyclist and bicycle on a dirt track; the same cyclist and bicycle on a 5° inclined surface; the same cyclist and bicycle on a −5° inclined surface with a back wind of 10 miles per hour. The command module could also, for example, simulate a stationary ergometric exercise device having a fan with vents on an outer housing of the fan that can be adjusted so as to adopt various positions and thereby affect and control the airstream travelling through the fan on operation of the pedals to drive rotation of the fan.

With reference to the dynamic cycling parameters referred to above, it will be appreciated that the drag force experienced by a cyclist under such conditions will vary according to speed as a result of fluid dynamics.

Accordingly, in particularly preferred embodiments, the command module may be configured to calculate the actual speed of a bicycle based on the cadence measured by the measuring device and the distance travelled per revolution of the pedal cranks, as outlined above.

In other such embodiments, the command module may be configured to use measurements received from the measuring device to calculate speed of rotation of the flywheel. It will be appreciated that the speed of rotation of the flywheel will provide a value indicative of the actual speed of a bicycle.

In either case, the command module may be configured to use the calculated speed in order to adjust the predetermined performance profile so as to reflect the effect of the user's speed on the one or more dynamic cycling parameters employed in the calculation of the predetermined performance profile.

It is envisaged that in order to input the selected cycling parameters, a user will ideally connect an external device, such as a smart phone, tablet, smart watch or other computing device to the communications module of the stationary ergometric exercise device.

In embodiments of the invention, such a connection may be achieved by means of a wired connection. In such embodiments, a data cable, such as a USB cable, may be connected between sockets on the external device and the communications module.

In other embodiments of the invention, such a connection may be achieved through the inclusion in the communications module of a radio configured to receive command signals and transmit feedback signals via a wireless communications protocol. The radio could, for example, be configured to form a paired communications link with an external device by means of a BLUETOOTH® or ANT+® communications link.

It will be appreciated that other wireless communications protocols could be used in order to create a wireless communications link between the communications module and an external device such as a smart phone, tablet, smart watch or other computing device depending on the functionality available from the external device and the functionality of the radio included in the communications module.

It is envisaged that in particularly preferred embodiments, the external device may include data concerning a cycling route that could be used to generate command signals to simulate a specific cycling route. The data may, for example, concern a particular stage of the Tour de France or an Olympic road race route.

In such embodiments, the command module may be configured to generate a predetermined performance profile based on the command signals pertaining to the characteristics of the chosen route. Such characteristics may include angle of inclination, rolling resistance between bicycle tyre and cycling surface and altitude. They could also include wind speed, wind direction and other weather characteristics in the event the user chooses to simulate the exact conditions of a previously recorded ride along the chosen route.

During the simulation, the command module calculates the power output of the user, in accordance with the methods outlined above, and compares against the predetermined performance profile in order to determine the power output that would be required at the measured cadence of the user. This enables the command module to adjust the braking force applied to the flywheel in order to tune the measurements received from the measuring unit and the measuring device so as to achieve the required power output and thereby simulate the resistance to pedalling that would be experienced by the user at that cadence, in the chosen gear and at the position along the route reached by the user.

It will be appreciated that the data concerning the chosen route could be provided in the form of a single transmission from the external device via the communications module. It will also be appreciated however that the data could be streamed continuously from the external device to the command module, via the communications module, during the simulation of the chosen route in order to allow the provision of more data and thus facilitate ongoing adjustment of the predetermined performance profile in order to provide a more detailed and accurate simulation.

In any event, the command module may transmit feedback signals via the communications module back to the external device that allows the external device to track the user's progress along the chosen route. This could be translated into a signal in the external device that allows the external device to generate a video image that might allow the user to visualise their journey along the chosen route.

In order to control movement of the one or more permanent magnets relative to the magnetic rim of the flywheel the one or more permanent magnets may be mounted on a yoke element connected to the motor to drive movement of the yoke towards and away from the magnetic rim of the flywheel and thereby drive movement of the one or more permanent magnets towards and away from the magnetic rim of the flywheel.

It is envisaged that in embodiments of the invention the flywheel may be formed from steel with a copper insert provided around an outer edge in order to create a magnetic rim section.

In particularly preferred embodiments, the flywheel may include a pair of wheel elements mounted on a common axle for rotation. In such embodiments, each of the wheel elements includes a magnetic rim and the brake device includes two sets of permanent magnets, each of the sets of permanent magnets being mounted for movement together with the other set of permanent magnets towards and away from the magnetic rim of a respective one of the wheel elements.

As outlined above, a stationary ergometric exercise device according to the invention requires the inclusion of a measuring unit to measure the drive force applied via the drive and/or the torque related to it. In particularly preferred embodiments, the stationary ergometric exercise device includes a measuring unit to measure the drive force applied via the drive. In such embodiments, the measuring unit includes an arm applied to a chain of the gear mechanism, the arm pressing slightly on the side of the chain and the measuring unit further including a measuring sensor to measure the restoring force applied by the traction mechanism to the arm.

In order to calculate feedback signals indicative of a user's performance, the command module may be configured to calculate and continuously output in the form of feedback signals to the communications module the temporal progress of the drive force and/or related torque, as well as variables derivable from it, on the basis of the measurements delivered to the command module by the measuring unit.

In order to measure cadence, the measuring device may include a pair of sensor pieces attached to the drive wheel and at least one sensor positioned in a stationary location relative to the drive wheel.

In other such embodiments, the measuring device may include a pair of sensors positioned in stationary locations relative to the drive wheel and at least one sensor piece attached to the drive wheel.

In either case, the one or more sensor pieces is movable with the drive wheel relative to the one or more sensors on operation of the drive by means of which the one or more sensors detects a passing sensor piece and is thereby able to calculate the speed of rotation of the drive wheel and thus the cadence or pedalling rate of the user.

By appropriate positioning of the one or more sensor pieces and the one or more sensors, the one or more sensors detects a passing sensor piece when the gear wheel is located at one of two specific angular positions, the positions being located 180° apart and corresponding to positions in motion of load alternation between the alternately operable drive elements.

Preferably the one or more sensor pieces is a magnet and the one or more sensors is a magnetic field sensor.

The ability to identify positions in motion of load alternation allows the measuring device to identify the times of load alternation between the alternately operable drive elements. In such embodiments, the command module may be further configured so as to receive signals from the measuring device identifying the times of load alternation between the alternately operable drive elements and, using the times of load alternation identified by the measuring device, to apportion variables calculated on the basis of measurements received from the measuring unit alternately to a right limb or left limb or a user.

This information may be transmitted via the communications module to an external device so as to display a POLAR VIEW™ illustrating the user's pedalling performance and technique with specific reference to the user's right and left limbs and thereby making it possible for the user to determine the areas in which his or her pedalling performance and/or technique might require improvement.

In a second aspect of the invention there is provided a method of operating a stationary ergometric exercise device including a foot-operable drive having alternately operable drive elements in the form of foot-driven pedals mounted via cranks to opposite sides of a gear wheel; a flywheel coupled to the gear wheel via a gear mechanism, the flywheel including a magnetic rim; a brake device in the form of one or more permanent magnets mounted for movement by means of a motor towards and away from the magnetic rim of the flywheel so as to selectively adjust a braking force applied to the flywheel by means of the one or more permanent magnets; a measuring unit for measuring, in use, at least one of drive force applied via the drive and the torque related to it; and a measuring unit for measuring, in use, cadence, the method comprising the steps of:
using measurements received from the measuring unit and the measuring device to calculate one or more performance parameters;
comparing the one or more performance parameters against a predetermined performance profile; and
controlling the motor so as to move the one or more permanent magnets relative to the magnetic rim of the flywheel in order to adjust the braking force applied by the one or more permanent magnets and thereby tune the measurements received from the measuring unit and the measuring device so as to adjust the one or more performance parameters calculated by the command module to conform with the predetermined performance profile.

In embodiments of the invention the method may further include the step of inputting performance characteristic data and calculating the predetermined performance profile based on the performance characteristic data.

The performance characteristic data may include information concerning one or more static cycling parameters selected from the group consisting of angle of inclination of cycling surface, rolling resistance between bicycle tyre and cycling surface, mass of cyclist, mass of bicycle, gear selection and cyclist power output.

The performance characteristic data may include information concerning one or more dynamic cycling parameters selected from the group consisting of air resistance created by changes in wind speed, air resistance created by changes in altitude, air resistance created by a fan.

Preferably the method further includes the step of calculating speed of rotation of the flywheel using measurements received from the measuring device and the step of adjusting the predetermined performance profile in response to the calculated speed so as to reflect the effect of speed on the one or more dynamic cycling parameters.

According to a third aspect of the invention there is provided a computer program or computer program product containing computer program code which, when executed on a computer or processer and memory, performs the method of operating a stationary ergometric exercise device outlined above.

BRIEF DESCRIPTION OF THE DRAWINGS

Preferred embodiments of the invention will now be described, by way of non-limiting examples, with reference to the accompanying drawings in which.

DETAILED DESCRIPTION

Figure 1:
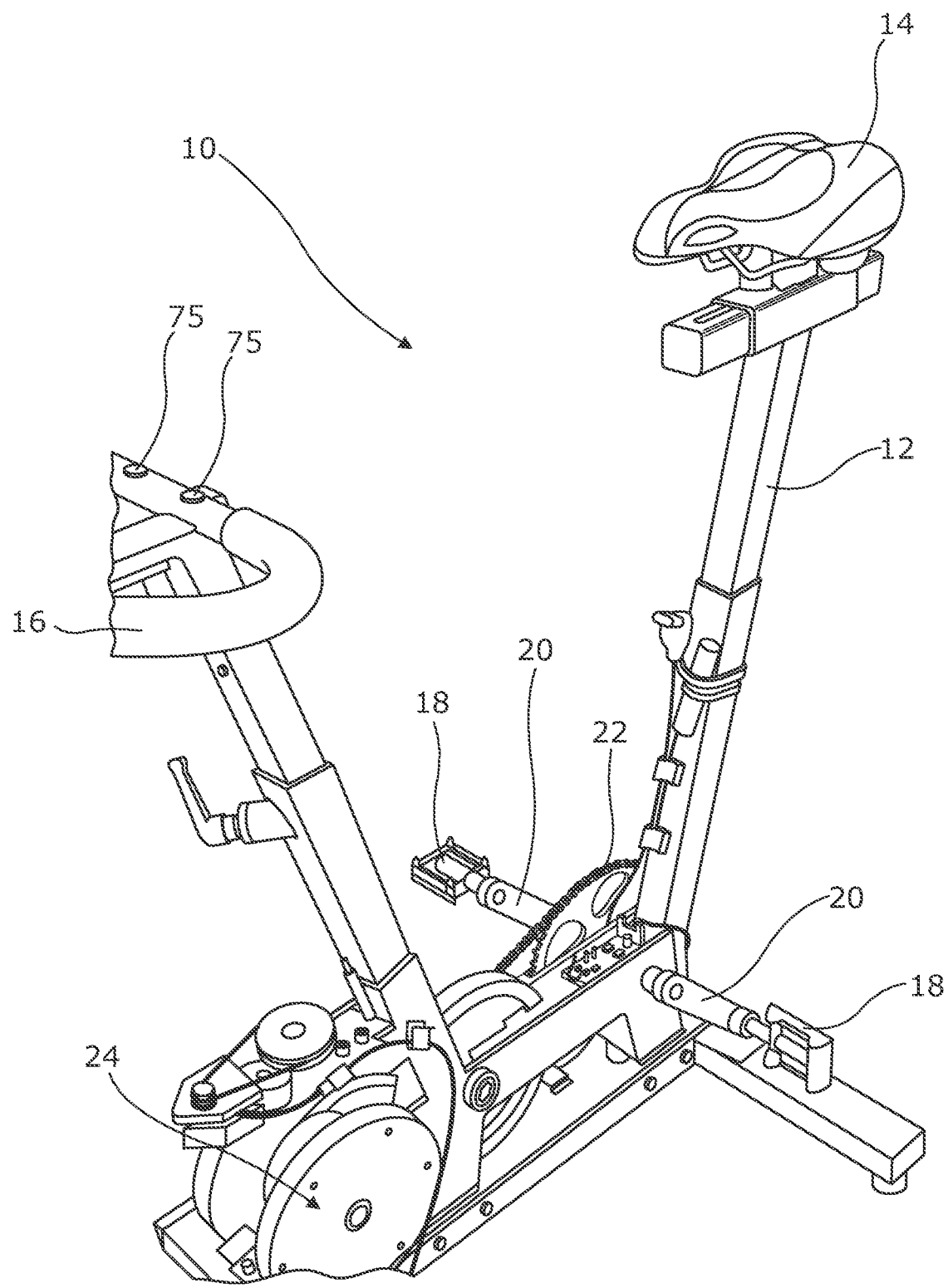
FIG. 1 shows a stationary ergometric exercise device according to an embodiment of the invention.

A stationary ergometric exercise device 10 according to an embodiment of the invention is shown in FIG. 1.

The exercise device 10 can be used, for example, as a home exercise machine, as a training device in a fitness studio or for use in elite sport. It can also be used in the medical field for assessment purposes.

The exercise device 10 has a bicycle-like frame 12 with a seat 14 and handlebars 16. The positions of the seat 14 and handlebars 16 are adjustable but are intended to be fixed during a training cycle. In the foot area, below the seat 14, the exercise device 10 includes a foot-operable drive including alternately operable drive elements in the form of foot-driven pedals 18. The pedals 18 are mounted via pedal cranks 20 to opposite sides of a drive wheel 22 by means of a pedal shaft 23 (FIG. 9) extending through the drive wheel 22.

Figure 5:
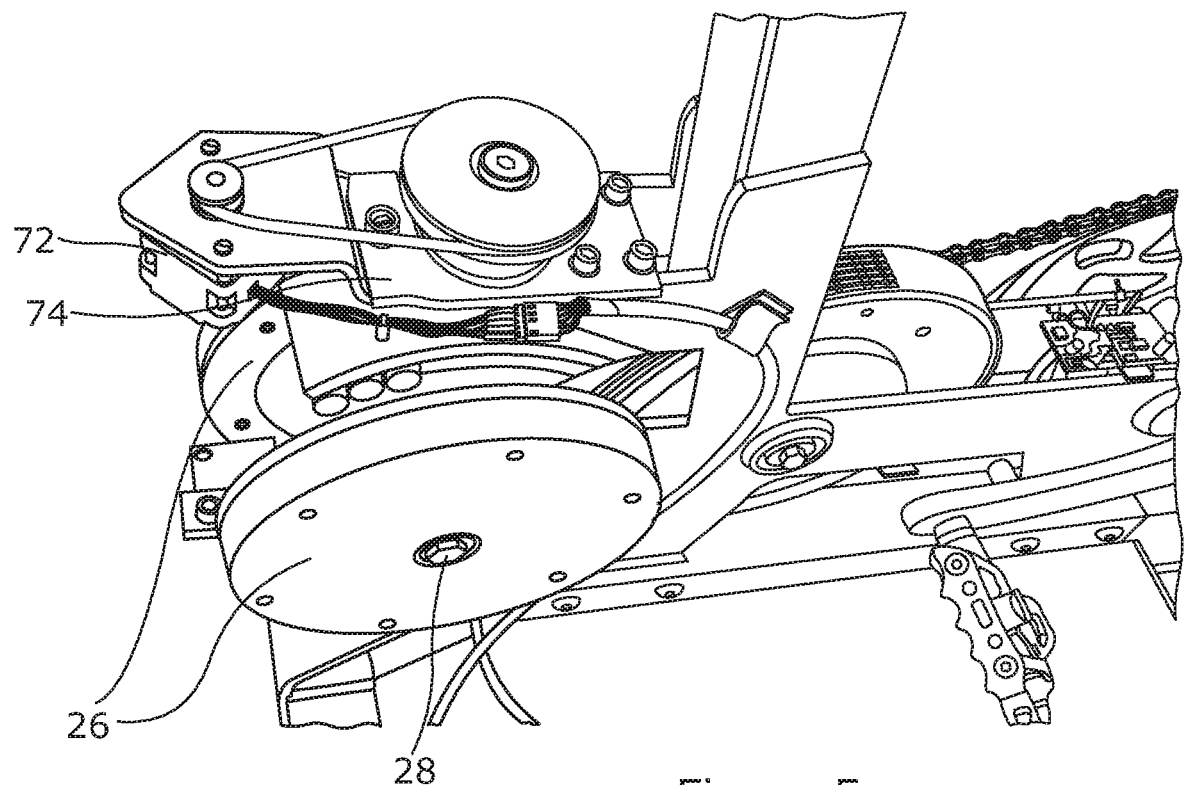
FIG. 5 shows a brake device and flywheel assembly of the stationary ergometric exercise device.

A flywheel assembly 24 is coupled to the drive wheel 22 via a gear mechanism. In the embodiment shown in FIG. 1, the flywheel assembly 24 includes a pair of flywheel elements 26, as shown in FIG. 5, mounted on a common shaft 28 for rotation.

Figure 2:
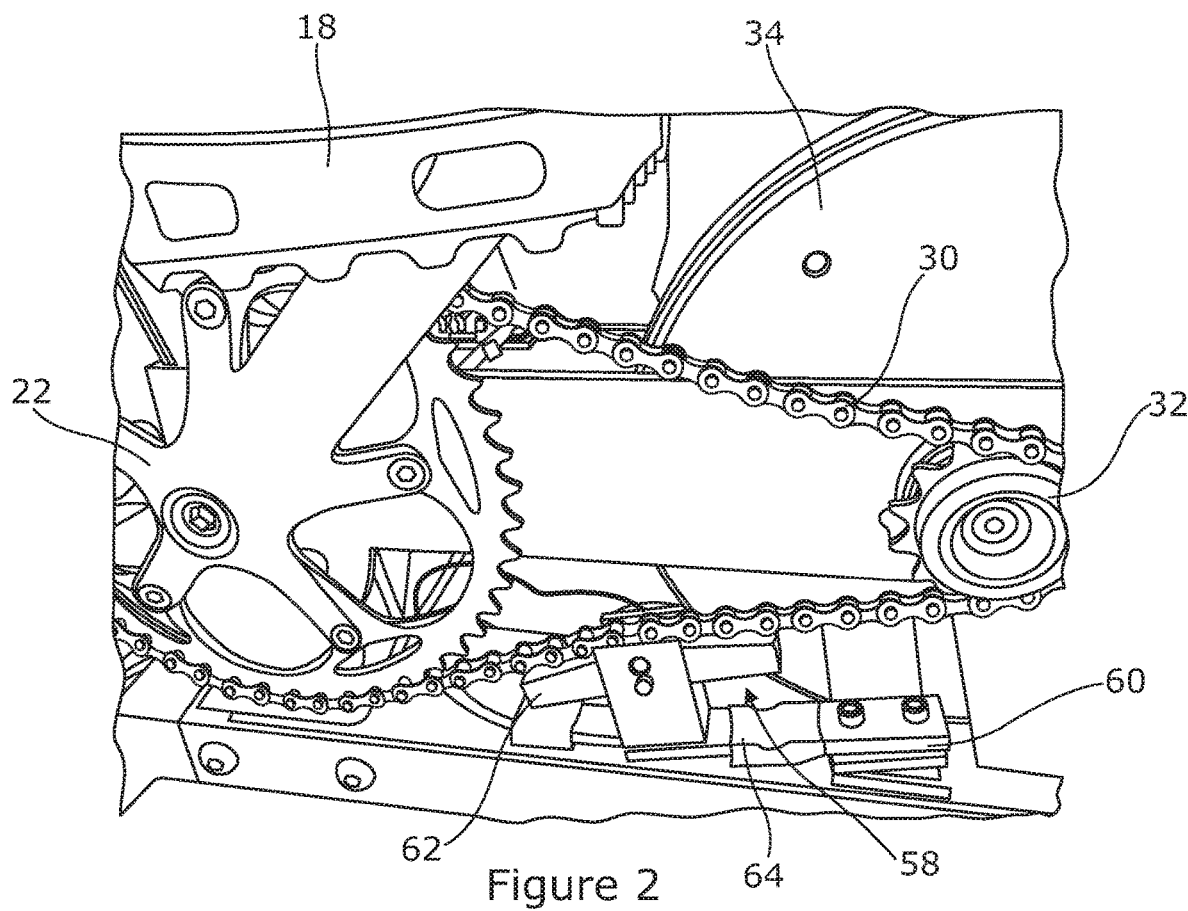
FIG. 2 shows a measuring device of the stationary ergometric exercise device shown in FIG. 1.

The gear mechanism includes a chain 30 extending about the drive wheel 22 and a pinion wheel 32 (FIG. 2). Operation of the pedals 18 drives rotation of the pedal shaft, which in turn drives rotation of the drive wheel 22. The drive wheel 22 drives rotation of the pinion wheel 32 by means of the chain 30, which in turn drives a shaft extending through the pinion wheel 32 and through a disc wheel 34 so as to drive rotation of the disc wheel 34.

Figure 4:
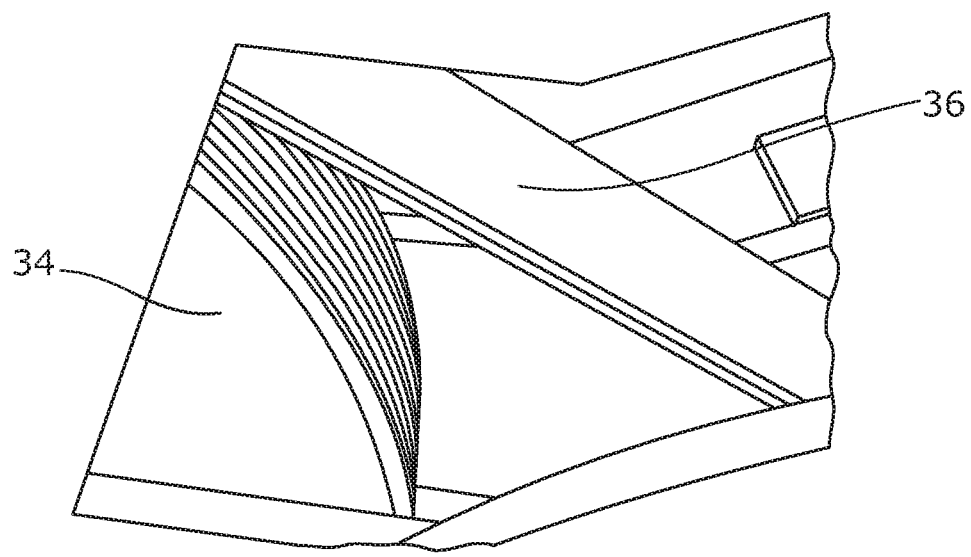
FIG. 4 shows a gear mechanism connecting a drive wheel to a flywheel of the stationary ergometric exercise device shown in FIG. 1.

The disc wheel 34 drives rotation of the common shaft 28 of the flywheel assembly 24 by means of a belt 36 (FIG. 4) stretched so as to extend around the disc wheel 34 and the common shaft 28.

Figure 6:
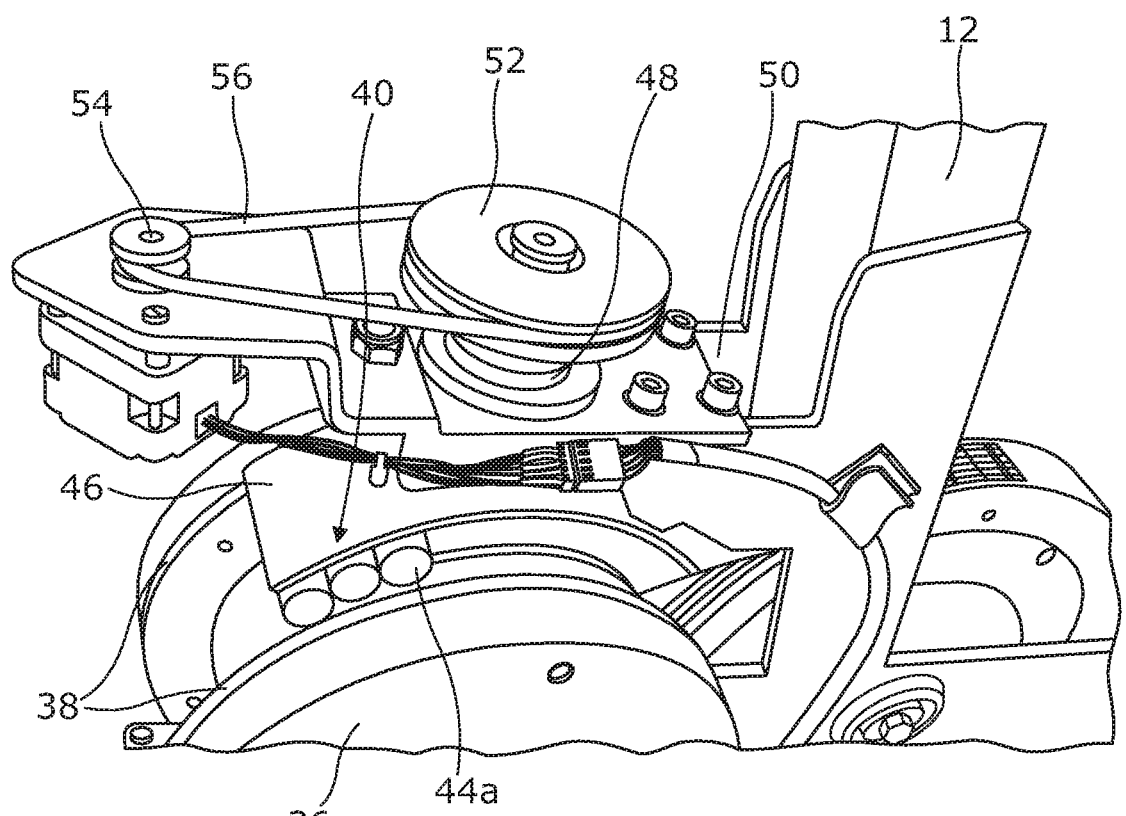
FIGS. 6 and 7 show a command module and a motor arranged to control movement of the brake device relative to a magnetic rim of flywheel elements of the flywheel assembly.

Each of the flywheel elements 26 is mounted on the common shaft 28 for rotation therewith and is formed from steel but includes a copper insert so as to form a magnetic rim section 38 (FIG. 6). A brake device 40 including a plurality of permanent magnets is mounted for movement by means of a servo motor 42 towards and away from the magnetic rims 38 of the flywheel elements 26. Movement of the permanent magnets towards and away from the magnetic rims 38 of the flywheel elements 26 varies a braking generated by the magnetic attraction between the permanent magnets and the magnetic rims 38 of the flywheel elements 26. Accordingly, by moving the permanent magnets relative to the magnetic rims 38 it is possible to adjust a braking force applied to the magnetic rims 38 of the flywheel elements 26 and thereby adjust the resistance to rotation of the flywheel elements 26 created by the magnetic attraction between the magnetic rims 38 of the flywheel elements 26 and the permanent magnets.

Figure 7:
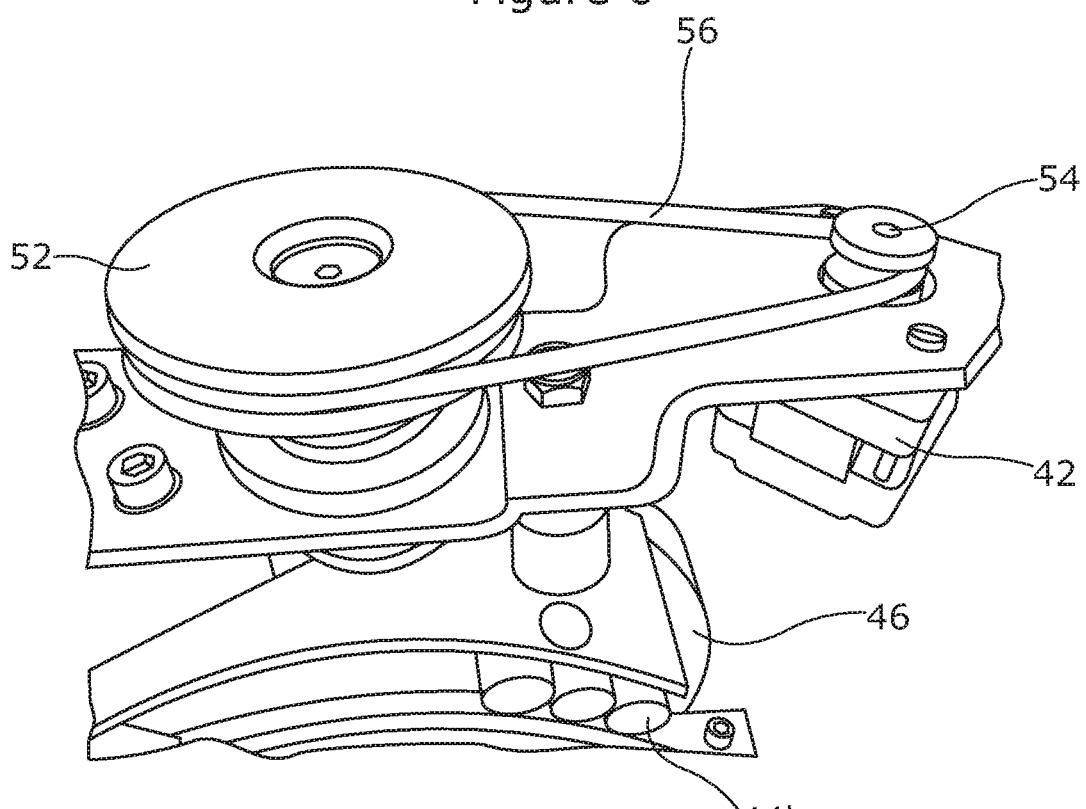

As shown in FIGS. 5 to 7, the permanent magnets are mounted so as to form two sets of permanent magnets 44a,44b supported in a yoke 46, each set of permanent magnets 44a,44b being mounted on opposite sides of the yoke 46 for movement towards and away from the magnetic rim 38 of a respective one of the flywheel elements 26.

So as to drive movement of the yoke 46, the yoke 46 is mounted on a first end of a threaded shaft 48 extending through a threaded aperture formed in a support 50 mounted on the bicycle-like frame 12. The threaded shaft 48 is secured at a second end within a pulley 52, which is in turn coupled to a driven shaft 54 of the servo motor 42 by means of a drive belt 56.

Operation of the servo motor 42 drives rotation of the driven shaft 54, which in turn drives rotation of the pulley 52 by means of the drive belt 56. Engagement of the threaded shaft 48 within the threaded aperture formed in the support 50 causes longitudinal movement of the threaded shaft 48 into and out of the threaded aperture, towards and away from the flywheel elements 26. The direction of travel of the threaded shaft 48, and thus the yoke 46, depends on the direction of rotation of the driven shaft 54 of the servo motor 42 and thus the direction of rotation of the threaded shaft 48.

The exercise device 10 includes a measuring unit 58 (FIG. 2) for measuring, in use, at least one of the drive force applied via the drive and the torque related to it. More particularly, the measuring unit 58 includes an arm 60 attached to the bicycle-like frame 12. A glide 62, preferably made from a plastics material, is attached to the arm 60 so as to press against an outer edge of the chain 30 extending about the drive wheel 22 and the pinion wheel 32.

In the embodiment shown in FIG. 2, the glide 62 presses the chain 30 slightly inwards. In other embodiments, the glide 62 could be positioned inwardly of the chain so as to press the chain 30 slightly outwardly.

In the event the chain 30 is under tension, as a result of a driving force being applied to the foot-driven pedals 18 by a user, then a tangential component of the force acts on the glide 62 as a restoring force that is proportional to the tension of the chain 30 and hence the drive force. The elastic bending of the arm 60 is measured by a stretch measuring strip 64.

It will be appreciated that since the restoring force is proportional to the tension of the chain 30, and hence the drive force, that measurements of the restoring force can be used to calculate the size of the driving force applied to the pedals 18 during operation of the exercise device 10.

Similarly, because the length of each of the pedal cranks 20 is known, measurements of the restoring force can be used to calculate the torque applied to the drive wheel 22 by means of the pedals 18.

In order to calibrate the force measurement, a mass of known size is attached to one of the pedals 18 and the flywheel elements 26 or the disc wheel 34 are locked so as to prevent rotation thereof. The force measured by means of the measuring unit 58 under these conditions allows the measuring unit 58 to be calibrated by comparing the restoring force with the known force applied by the known mass attached to the pedal 18.

In this embodiment, the measuring unit 58 is configured to continuously measure the drive force applied via the drive during operation of the exercise device 10. By continuous, it is envisaged that the measuring unit 58 measures the force applied via the drive up to 100 times per second.

Figure 3:
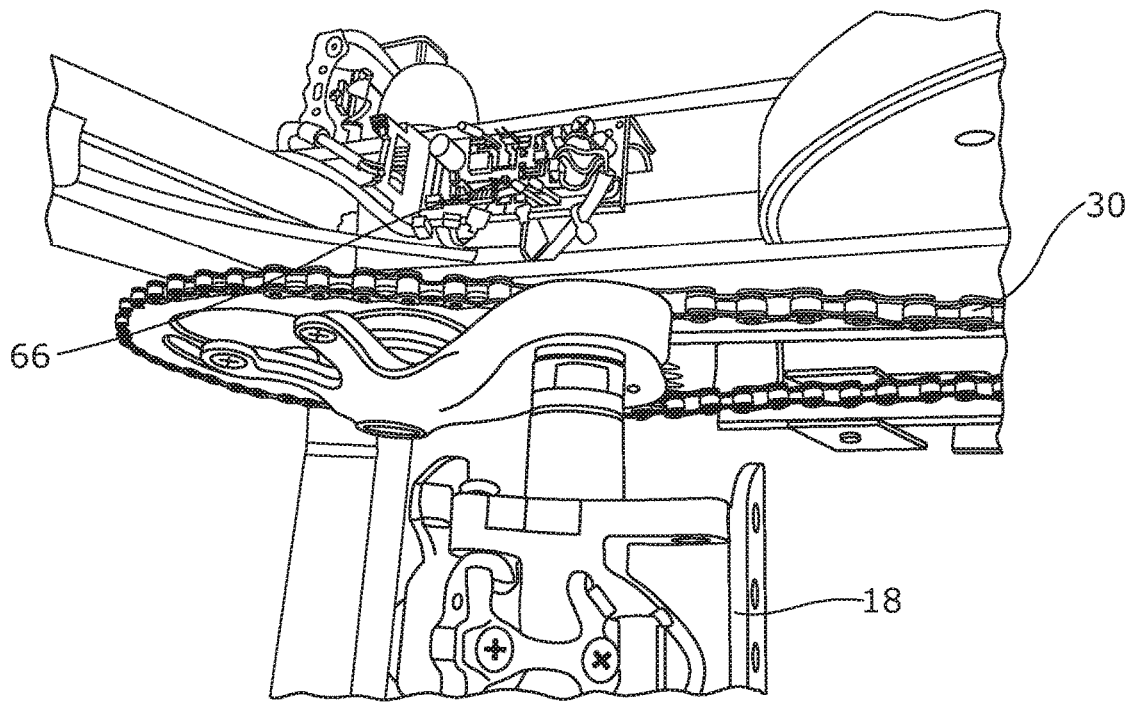
FIG. 3 shows a measuring unit of the stationary ergometric exercise device shown in FIG. 1.

The exercise device 10 also includes a measuring device 66 (FIG. 3) for measuring cadence during operation of the exercise device 10.

It will be appreciated that, in the context of cycling, cadence refers to the rate of pedalling or number of revolutions of the pedal cranks 20 per minute (RPM).

Figure 9:
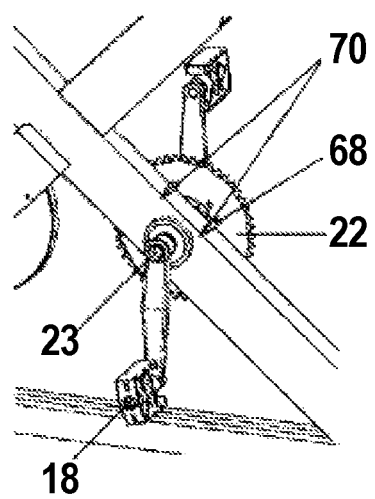
FIGS. 9 and 10 are schematic representations of the measuring unit shown in FIG. 3.
Figure 10:
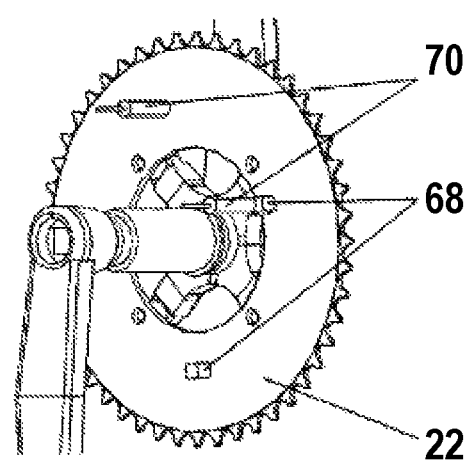

The measuring device 66 of the exercise device 10 shown in FIG. 1 is illustrated schematically in FIGS. 9 and 10 and includes a pair of sensor pieces 68 mounted on the drive wheel 22 and a pair of sensors 70 positioned in stationary locations on the bicycle-like frame 12.

The sensor pieces 68 and sensors 70 are positioned relative to each other such that, on rotation of the drive wheel 22, each of the sensor pieces 68 passes a respective one of the sensors 70 fixed to the bicycle-like frame 12 such that each sensor piece 68 is detected only once per cycle of rotation of the drive wheel 22 and is detected by the same sensor 70 on each cycle of rotation of the drive wheel 22. This is achieved by varying the radial distance of the sensor pieces on the drive wheel 22 pedal shaft. More particularly, one of the sensor pieces 68 is located at a greater radial distance from the pedal shaft on the drive wheel 22 than the other of the sensor pieces 68. Similarly, by positioning the sensors 70 on the bicycle-like frame 12 so that they are located at correspondingly spaced locations relative to the pedal shaft, each sensor 70 detects only one of the sensor pieces 68 during rotation of the drive wheel 22.

The relative positions of the sensor pieces 68 and the sensors 70 are also chosen such that a sensor piece 68 is moved into alignment with a respective sensor 70 at 180° intervals and such that the position in motion of the drive wheel 22 at the point at which each of the sensor pieces 68 is moved into alignment with the respective sensor 70 corresponds to a position in motion of load alternation between the pedals 18.

Accordingly, during each complete revolution of the drive wheel 22, the sensor pieces 68 and sensors 70 generate two signals at 180° intervals. The time between these signals can be used to calculate the rate of rotation of the drive wheel 22 and thus the rate of pedalling—otherwise referred to as cadence.

Similarly, because the signals are generated at 180° intervals and correspond to points at which there is a load alternation in terms of a user switching driving force from one pedal to the other, the signals generated by the sensor pieces 68 passing the sensors 70 can be interpreted as being indicative of a time of load alternation.

In the embodiment illustrated in FIGS. 9 and 10 the sensor pieces 68 are magnets and the sensors 70 are magnetic field sensors. In other embodiments it is envisaged that other sensor pieces and sensors may be employed.

It is also envisaged that in other embodiments the number of sensor pieces 68 or number of sensors 70 may be changed. In one such embodiment, one sensor piece 68 may be fixed to the drive wheel 22 and the sensors 70 may be mounted on the bicycle-like frame 12 at fixed locations such that the sensor piece 68 passes each of the sensors 70 at intervals of 180°. In such an embodiment, the sensor piece 68 and sensors 70 are again located relative to each other such that the sensor piece 68 is moved into alignment with each of the sensors 70, during rotation of the drive wheel 22, at a position in motion of the drive wheel 22 corresponding to a load alternation between the foot operable pedals 18.

In another such embodiment, a pair of sensor pieces 68 may be fixed to the drive wheel 22 and one sensor 70 may be mounted on the bicycle-like frame 12 at a fixed location such that each of the sensor pieces 68 passes the sensor 70 at intervals of 180°. In such an embodiment, the sensor pieces 68 and sensor 70 are again located relative to each other such that the sensor 70 detects a respective one of the sensor pieces 68, during rotation of the drive wheel 22, at a position in motion of the drive wheel 22 corresponding to a load alternation between the foot operable pedals 18.

So as to collate the data collected by means of the measuring unit 58 and the measuring device 66, the exercise device 10 includes a command module 72 (FIG. 5).

The command module 72 is preferably a programmable device connected to the measuring unit 58 and the measuring device 66 so as to receive signals indicative of the drive force applied during operation of the exercise device to the chain 30, and the rate of rotation of the pedals together with the times of load alternation between the two pedals 18.

The command module 72 is configured to use the measurements received from the measuring unit 58 and the measuring device 66 in order to calculate one or more performance parameters. Those performance parameters may include cadence, power, speed of rotation of the flywheel, drive force applied to the pedals and other variables derivable therefrom.

Those performance parameters may be transmitted from the command module 72 to a communications module 74 for onward transmission to a user interface (not shown) connected to the communications module 74. The command module 72 is also however configured so as to compare at least one or more of the calculated performance parameters against a predetermined performance profile.

Depending on the results of the comparison, which will be discussed in more detail below, the command module 74 is connected to the servo motor 42 and is configured to control the servo motor 42 so as to move the two sets of permanent magnets 44a,44b relative to the magnetic rims 38 of the flywheel elements 26. By adjusting the relative positions of the two sets of permanent magnets 44a,44b relative to the magnetic rims 38 of the flywheel elements 26, the command module 72 adjusts the braking force applied by the two sets of permanent magnets 44a,44b. This in turn affects the resistance to rotation of the flywheel elements 26 and thus affects measurements obtained via the measuring unit 58 and the measuring device 66. By appropriate control of the servo motor 42 therefore, the command module 72 is operable to tune the measurements received from the measuring unit 58 and the measuring device 66 so as to adjust the one or more performance parameters calculated by the command module to conform with the predetermined performance profile.

As outlined above, the command module 72 is connected to a communications module 74 for the purposes of transmitting signals representative of the performance parameters calculated by the command module 72 to an external device for display on a user interface.

As well as transmitting signals to an external device in the form of feedback signals reporting user performance, the communications module 74 is configured to receive command signals and transmit those signals to the command module 72.

In the embodiment shown in FIG. 1 the communications module 74 includes a radio configured to receive command signals and transmit feedback signals via the wireless communications protocol known as BLUETOOTH®. This allows wireless connection of the communications module 74 to an external device such as a smart phone, a tablet, a smart watch or another computing device.

In other embodiments it is envisaged that another wireless communications protocol, such as ANT+® may be used in order to create a wireless data connection between the communications module 74 and an external device. It is also envisaged that a wired connection may be used to connect the communications module 74 to an external device. The communications module 74 could for example be connected to an external device by means of a data transfer cable such as a USB cable.

The provision of a communications module 74 to facilitate connection to an external device, such as a smart phone, tablet, smart watch or other computing device, allows the creation of a user interface. It is envisaged that the communications module 74 could be connected to a smart phone, tablet, smart watch or other computing device running an application configured to communicate with the communications module 74 and thereby allow a user to input data for the purposes of creating a predetermined performance profile.

The communications module 74 could also be connected to such a device to allow the creation of a visualisation of the feedback signals on a screen of the device. The interface could, for example, display the cadence and/or force measurements. It could also or alternatively display one or more performance parameters calculated by the command module from the measurements obtained from the measuring unit 58 and the measuring device 66.

The interface could also display a POLAR VIEW™ based on the times of load alternation determined by the measuring device 66 and the force measurements and other variables thereof calculated by the command module 72 in response to measurements received from the measuring unit 58. The creation of a POLAR VIEW™, which shows force against time, illustrates the user's pedalling performance and technique with specific reference to the user's right and left limbs. It therefore creates a visual impression of a user's cycling performance and allows a user visually to determine the areas in which his or her pedalling performance and/or technique might require improvement.

Figure 8:
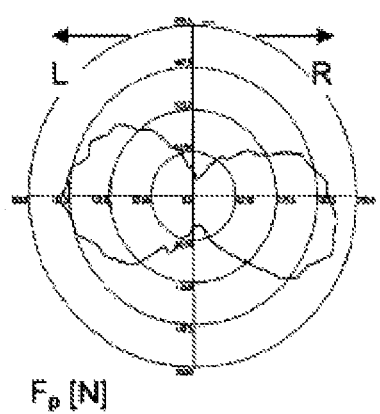
FIG. 8 illustrate an exemplary POLAR VIEW™.

An example of a POLAR VIEW™ is shown in FIG. 8.

Operation of the exercise device 10 will now be described.

During operation of the exercise device 10, a user drives rotation of the flywheel elements 26 through operation of the pedals 18. The resultant drive force applied to the chain extending around the drive wheel 22 is measured by means of the measuring unit 58 on a continuous basis, as outlined above, and the resultant measurements are transmitted to the command module 72.

Similarly, the cadence or rate of pedalling is measured by the measuring device 66 and the resultant measurements together with signals indicative of the time of load alternation between the pedals 18 are transmitted to the command module 72.

The command module 72 uses the measurements and signals received from the measuring device 58 and the measuring unit 66 and calculates the power output of the user.

The command unit 72 preferably calculates the power output of the user once per revolution of the pedal cranks 20 on the basis that power=force×speed, and the speed can be calculated with reference to the measured cadence and the distance travelled per revolution of the pedal cranks 20. As outlined above, the distance travelled per revolution of the pedal cranks 20 may be pre-set within the command module according to a series of pre-set gears. The command module 72 may be configured to increase the braking force applied to the flywheel assembly 24 on selection by a user of a higher gear, and vice versa, in order to simulate the additional resistance that would be experienced by a cyclist on changing gear on a real bicycle. Similarly, the command module 72 may be configured to increase the distance travelled per revolution of the pedal cranks 20 incrementally with each gear from the lowest gear up to the highest gear, and vice versa.

In a particularly preferred embodiment, the distance travelled per revolution increases incrementally from a minimum of 2.790 m in a bottom gear, gear 1, to a maximum of 10.258 m in a top gear, gear 22, as set out in Table 1 below.

TABLE 1

| Gear | Distance travelled per revolution of pedal crank (m) |
| --- | --- |
| 1 | 2.790 |
| 2 | 3.146 |
| 3 | 3.501 |
| 4 | 3.857 |
| 5 | 4.213 |
| 6 | 4.568 |
| 7 | 4.924 |
| 8 | 5.279 |
| 9 | 5.635 |
| 10 | 5.991 |
| 11 | 6.346 |
| 12 | 6.702 |
| 13 | 7.058 |
| 14 | 7.413 |
| 15 | 7.769 |
| 16 | 8.124 |
| 17 | 8.480 |
| 18 | 8.836 |
| 19 | 9.191 |
| 20 | 9.547 |
| 21 | 9.903 |
| 22 | 10.258 |

In such embodiments, it will be appreciated that a user operating the exercise device in gear 1 at a cadence of 60 revolutions per minute would equate to a speed of 2.790 $ms^{-1}$.

In order to allow a user to change up and down through gears, buttons 75 may be included on handlebars 16 so as to allow the user readily to move up and down through the gears as if they were riding a real bicycle. Such buttons 75 may be connected directly to the command module 72 in order to provide the required signal and preferably include one button for changing up through the gears and a second for changing down through the gears.

In other embodiments, the buttons 75 may be configured to send command signals to the communications module 74 for onward transmission to the command module 72.

The command module 72 may also calculate other performance parameters or variables derivable from the drive force for transmission via the communications module 74 to an external device connected to the communications module 74 in order to provide a user interface.

In its simplest form, the user may create a predetermined performance profile in the command module 72 aimed at ensuring that the user achieves a constant power output during operation of the exercise device 10. This is achieved by using the cadence and force measurements to calculate the actual power output of the user, comparing the calculated power against the power output value required by the predetermined performance profile and controlling the motor so as to increase or decrease the braking force so as to require the user to apply a greater or lower force to the pedals in order to achieve the required power output at the same cadence.

The user may also select from a series of predetermined performance profiles before commencing a training program. The user could, for example, select a predetermined performance profile that defines a curvilinear relationship between power and cadence for a particular gear. Thereafter, on operation of the exercise device 10, the command module 72 uses the cadence and force measurements to calculate the actual power output of the user and compares the calculated power value together with the cadence measurement against the curvilinear relationship between power and cadence defined by the predetermined performance profile.

On performing this comparison, the command module 72 is able to determine whether the actual power output of the user is higher or lower than is required by the predetermined performance profile for the measured cadence and operates the servo motor 42 so as to adjust the relative positions of the sets of permanent magnets 44a,44b relative to the flywheel elements 26 so as to adjust the braking force applied by the sets of permanent magnets 44a,44b on the flywheel elements 26. This in turn increases or decreases the driving force required from the user to drive the pedals at the same cadence and can be used to tune the measurements obtained from the measuring unit 58 and the measuring device 66 so that the calculated power output of the user conforms with the power required by the predetermined performance profile for the measured cadence.

In the embodiment shown in the figures, the command module 72 is also configured to calculate the predetermined performance profile on receipt of performance characteristic data in the form of command signals from the communications module 74.

This allows a user to input a series of cycling parameters into an external device connected to the communications module 74 that are in turn communicated to the command module 72 via the communications module 74, and allow the command module 72 to calculate a tailor-made predetermined performance profile based on the selected cycling parameters.

The performance characteristic data may include information concerning one or more static cycling parameters selected from the group consisting of angle of inclination of cycling surface, rolling resistance between bicycle tyre and cycling surface, mass of cyclist, mass of bicycle and cyclist power output.

The performance characteristic data may also include information concerning one or more dynamic cycling parameters selected from the group consisting of air resistance created by changes in wind speed, air resistance created by changes in altitude and air resistance created through the use of a fan.

On receipt of this information from the external device, in the form of command signals received via the communications module 74, the command module 72 is configured to calculate the effects of any selected cycling parameters on the drag force that a cyclist would experience riding a bicycle under those conditions. This in turn allows the command module 72 to calculate a predetermined performance profile taking into account the additional drag force.

In the particularly preferred embodiment, in which the distance travelled per revolution of the pedals cranks 20 is pre-set within the command module according to the series of pre-set gear set out in Table 1 above, the command module calculates the additional power required to overcome a drag force created by a user body mass of 70 kg cycling on a flat road with no slope and zero wind resistance according to the pre-set gear set and exemplary cadence figures as set out below in Table 2.

TABLE 2

| Gear | Distance travelled per revolution of pedal cranks (m) | Cadence (rpm) | Power (W) |
|---|---|---|---|
| 1 | 2.790 | 30 | 7 |
| 2 | 3.146 | 35 | 9 |
| 3 | 3.501 | 40 | 13 |
| 4 | 3.857 | 45 | 18 |
| 5 | 4.213 | 50 | 25 |
| 6 | 4.568 | 55 | 36 |
| 7 | 4.924 | 60 | 50 |
| 8 | 5.279 | 65 | 69 |
| 9 | 5.635 | 70 | 96 |
| 10 | 5.991 | 75 | 132 |
| 11 | 6.346 | 80 | 181 |
| 12 | 6.702 | 85 | 245 |
| 13 | 7.058 | 90 | 328 |
| 14 | 7.413 | 95 | 435 |
| 15 | 7.769 | 100 | 572 |
| 16 | 8.124 | 105 | 745 |
| 17 | 8.480 | 110 | 961 |
| 18 | 8.836 | 115 | 1,229 |
| 19 | 9.191 | 120 | 1,557 |
| 20 | 9.547 | 125 | 1,958 |
| 21 | 9.903 | 130 | 2,442 |
| 22 | 10.258 | 135 | 3,025 |

It will be appreciated that the drag force that would be created if the user was riding a bicycle under such conditions would increase with the cadence of the user in each gear and thus the speed of travel of the bicycle.

Examples of the power required to overcome the increasing drag force in gears 1, 10 and 22 for incremental increases in cadence, as calculated by the command module, are illustrated in Tables 3, 4 and 5 below.

TABLE 3

| Gear | Distance travelled per revolution of pedal cranks (m) | Cadence (rpm) | Power (W) |
|---|---|---|---|
| 1 | 2.790 | 30 | 7 |
| 1 | 2.790 | 35 | 8 |
| 1 | 2.790 | 40 | 10 |
| 1 | 2.790 | 45 | 11 |
| 1 | 2.790 | 50 | 13 |
| 1 | 2.790 | 55 | 15 |
| 1 | 2.790 | 60 | 17 |
| 1 | 2.790 | 65 | 20 |

TABLE 3-continued

| Gear | Distance travelled per revolution of pedal cranks (m) | Cadence (rpm) | Power (W) |
|---|---|---|---|
| 1 | 2.790 | 70 | 22 |
| 1 | 2.790 | 75 | 25 |
| 1 | 2.790 | 80 | 28 |
| 1 | 2.790 | 85 | 32 |
| 1 | 2.790 | 90 | 36 |
| 1 | 2.790 | 95 | 40 |
| 1 | 2.790 | 100 | 44 |
| 1 | 2.790 | 105 | 49 |
| 1 | 2.790 | 110 | 54 |
| 1 | 2.790 | 115 | 59 |
| 1 | 2.790 | 120 | 65 |
| 1 | 2.790 | 125 | 72 |
| 1 | 2.790 | 130 | 79 |
| 1 | 2.790 | 135 | 86 |

TABLE 4

| Gear | Distance travelled per revolution of pedal cranks (m) | Cadence (rpm) | Power (W) |
|---|---|---|---|
| 10 | 5.991 | 30 | 19 |
| 10 | 5.991 | 35 | 25 |
| 10 | 5.991 | 40 | 32 |
| 10 | 5.991 | 45 | 41 |
| 10 | 5.991 | 50 | 51 |
| 10 | 5.991 | 55 | 63 |
| 10 | 5.991 | 60 | 77 |
| 10 | 5.991 | 65 | 93 |
| 10 | 5.991 | 70 | 111 |
| 10 | 5.991 | 75 | 132 |
| 10 | 5.991 | 80 | 156 |
| 10 | 5.991 | 85 | 182 |
| 10 | 5.991 | 90 | 211 |
| 10 | 5.991 | 95 | 244 |
| 10 | 5.991 | 100 | 280 |
| 10 | 5.991 | 105 | 319 |
| 10 | 5.991 | 110 | 363 |
| 10 | 5.991 | 115 | 410 |
| 10 | 5.991 | 120 | 461 |
| 10 | 5.991 | 125 | 516 |
| 10 | 5.991 | 130 | 576 |
| 10 | 5.991 | 135 | 641 |

TABLE 5

| Gear | Distance travelled per revolution of pedal cranks (m) | Cadence (rpm) | Power (W) |
|---|---|---|---|
| 22 | 10.258 | 30 | 54 |
| 22 | 10.258 | 35 | 77 |
| 22 | 10.258 | 40 | 106 |
| 22 | 10.258 | 45 | 142 |
| 22 | 10.258 | 50 | 186 |
| 22 | 10.258 | 55 | 238 |
| 22 | 10.258 | 60 | 301 |
| 22 | 10.258 | 65 | 374 |
| 22 | 10.258 | 70 | 459 |
| 22 | 10.258 | 75 | 557 |
| 22 | 10.258 | 80 | 668 |
| 22 | 10.258 | 85 | 793 |
| 22 | 10.258 | 90 | 933 |
| 22 | 10.258 | 95 | 1,089 |
| 22 | 10.258 | 100 | 1,263 |
| 22 | 10.258 | 105 | 1,454 |
| 22 | 10.258 | 110 | 1,664 |
| 22 | 10.258 | 115 | 1,893 |
| 22 | 10.258 | 120 | 2,143 |
| 22 | 10.258 | 125 | 2,414 |

TABLE 5-continued

| Gear | Distance travelled per revolution of pedal cranks (m) | Cadence (rpm) | Power (W) |
|---|---|---|---|
| 22 | 10.258 | 130 | 2,708 |
| 22 | 10.258 | 135 | 3,025 |

The command module 72 could, for example, generate a predetermined performance profile based on power output versus cadence that is calculated to take account of the drag force that would be experienced as a result of the selected cycling parameters. This would allow the command module 72 to control the servo motor 42 and thereby control movement of the sets of permanent magnets 44a,44b relative to the magnetic rims 38 of the flywheel elements 26 so as to create the required drag force and thereby simulate various cycling conditions.

By appropriate selection of cycling parameters, a user may create command signals instructing the command module 72 to simulate an infinite number of combinations of cycling conditions. For example, the command module 72 could simulate a light cyclist riding a light bicycle on a velodrome surface; the same cyclist and bicycle on a dirt track; the same cyclist and bicycle on a 5° inclined surface; the same cyclist and bicycle on a −5° inclined surface with a back wind of 10 miles per hour.

The command module 72 could also, for example, simulate a stationary ergometric exercise device having a fan with vents on an outer housing of the fan that can be adjusted so as to adopt various positions and thereby affect and control the airstream travelling through the fan on operation of the pedals to drive rotation of the fan.

With reference to the dynamic cycling parameters referred to above, the drag force experienced by a cyclist under such conditions will vary according to speed as a result of fluid dynamics. Accordingly, the command module 72 may be configured to use measurements received from the measuring device 66 to calculate speed of rotation of the flywheel elements 26 or the equivalent speed of a real bicycle being operated at the same cadence and at the same driving force.

The speed of a real bicycle could be calculated, as outlined above, with reference to the measured cadence and the distance travelled per revolution of the pedal cranks 20.

The speed of rotation of the flywheel elements 26 is also indicative of the actual speed of a bicycle which may also or alternatively be used by the command module 72 to adjust the predetermined performance profile so as to reflect the effect of the user's speed on the one or more dynamic cycling parameters employed in the calculation of the predetermined performance profile.

In other embodiments, the external device may include data concerning a cycling route that could be used to generate command signals to simulate a specific cycling route. The data may, for example, concern a particular stage of the Tour de France or an Olympic road race route.

In such embodiments, the command module 72 may be configured to generate a predetermined performance profile based on the command signals pertaining to the characteristics of the chosen route. Such characteristics may include angle of inclination, rolling resistance between bicycle tyre and cycling surface and altitude. They could also include wind speed, wind direction and other weather characteristics in the event the user chooses to simulate the exact conditions of a previously recorded ride along the chosen route.

During the simulation, the command module 72 calculates the power output of the user, in accordance with the methods outlined above, and compares against the predetermined performance profile in order to determine the power output that would be required at the measured cadence of the user. This enables the command module 72 to control the servo motor 42 and thereby control movement of the sets of permanent magnets 44a,44b relative to the magnetic rims 38 of the flywheel elements 26 in order to tune the measurements received from the measuring unit 58 and the measuring device 66 so as to achieve the required power output and thereby simulate the resistance to pedalling that would be experienced by the user at that cadence, in the chosen gear and at the position along the route reached by the user.

It will be appreciated that the data concerning the chosen route could be provided in the form of a single transmission from the external device via the communications module 74. It will also be appreciated however that the data could be streamed continuously from the external device to the command module 72, via the communications module 74, during the simulation of the chosen route in order to allow the provision of more data and thus facilitate ongoing adjustment of the predetermined performance profile in order to provide a more detailed and accurate simulation.

In any event, the command module 72 may transmit feedback signals via the communications module 74 back to the external device that allows the external device to track the user's progress along the chosen route. This could be translated into a signal in the external device that allows the external device to generate a video image that might allow the user to visualise their journey along the chosen route.

The invention claimed is:

1. A stationary ergometric exercise device comprising:
a foot-operable drive including alternately operable drive elements in the form of foot-driven pedals mounted via pedal cranks to opposite sides of a drive wheel;
a flywheel coupled to the drive wheel via a gear mechanism;
a brake device configured to selectively adjust a braking force applied to the flywheel;
a measuring unit for measuring, in use, at least one of a drive force applied via the foot-operable drive and a torque related to it;
a measuring device for measuring, in use, cadence;
a command module connected to the measuring unit, the measuring device, and the brake device; and
wherein the command module is configured (a) to continuously calculate a required power output to be achieved by the user, based on performance characteristic data that includes both static and dynamic performance parameters; (b) to receive measurements from the measuring unit and the measuring device and to use those measurements to calculate a calculated power output of the user at the measured cadence and to compare the calculated power output of the user against the required power output to be achieved by the user at the measured cadence, and (c) to control the brake device to adjust the braking force applied by the brake device in such a manner as to tune the measurements received from the measuring unit and the measuring device so as to adjust the calculated power output to conform with the required power output at the measured cadence.

2. The stationary ergonomic exercise device according to claim 1, further comprising a communications module connected to the command module and configured to receive command signals and transmit those command signals to the command module and configured to transmit feedback signals received from the command module reporting user performance.

3. The stationary ergometric exercise device according to claim 2 wherein the communications module is configured to receive the command signals and transmit the feedback signals via a wired connection.

4. The stationary ergometric exercise device according to claim 2 wherein the communications module includes a radio configured to receive the command signals and transmit the feedback signals via a wireless communications protocol.

5. The stationary ergometric exercise device according to claim 2 wherein the command module is configured to calculate a performance profile on receipt of the command signals pertaining to the characteristics of a specific cycling route.

6. The stationary ergometric exercise device according to claim 1, wherein the measuring unit is configured to continuously measure, in use, at least one of the drive force applied via the foot-operable drive and the torque related to it.

7. The stationary ergometric exercise device according to claim 6 wherein the measuring unit is configured to measure, in use, at least one of the drive force applied via the foot-operable drive and the torque related to it at a rate of at least 100 times per second.

8. The stationary ergometric exercise device according to claim 1 wherein the command module is configured to calculate the calculated power output of a user once per revolution of the pedal cranks based on the relationship that power=force×speed and based on speed calculated based on the cadence measured by the measuring device and a pre-set distance travelled per revolution of the pedal cranks.

9. The stationary ergometric exercise device according to claim 1 wherein the command module is configured to simulate a series of pre-set gears so as to increase the braking force applied to the flywheel on selection, in use, of a higher gear, and vice versa, and to increase a pre-set distance travelled per revolution of the pedal cranks incrementally with each of the pre-set gears from a lowest gear up to a highest gear, and vice versa.

10. The stationary ergometric exercise device according to claim 9 further including buttons provided on handlebars and configured to send the command signals to the communications module to move up and down through each of the pre-set gears.

11. The stationary ergometric exercise device according to claim 1 wherein the performance characteristic data includes information concerning one or more static cycling parameters selected from a group consisting of angle of inclination of cycling surface, rolling resistance between bicycle tyre and cycling surface, mass of cyclist, mass of bicycle, gear selection and cyclist power output.

12. The stationary ergometric exercise device according to claim 1 wherein the performance characteristic data includes information concerning one or more dynamic cycling parameters selected from a group consisting of air resistance created by changes in wind speed, air resistance created by changes in altitude, air resistance created by use of a fan.

13. The stationary ergometric exercise device according to claim 12 wherein the command module is configured to use the measurements received from the measuring device to calculate speed of rotation of the flywheel and is also configured to adjust the predetermined performance profile in response to the calculated speed so as to reflect the effect of speed on the one or more dynamic cycling parameters.

14. The stationary ergometric exercise device according to claim 1 wherein the brake device includes a yoke element to receive one or more permanent magnets, the yoke element being connected to a motor to drive movement of the one or more permanent magnets relative to a magnetic rim of the flywheel.

15. The stationary ergometric exercise device according to claim 1 wherein the flywheel includes a pair of wheel elements mounted on a common axle for rotation, each of the wheel elements including a magnetic rim, and the brake device includes two sets of permanent magnets, each of the sets of permanent magnets being mounted for movement together with the other set of permanent magnets towards and away from a magnetic rim of a respective one of the wheel elements.

16. The stationary ergometric exercise device according to claim 1 wherein the measuring unit measures, in use, the drive force applied via the foot-operable drive and includes an arm applied to a chain of the gear mechanism, the arm pressing slightly on the side of the chain and the measuring unit further including a measuring sensor to measure a restoring force applied by a traction mechanism to the arm.

17. The stationary ergometric exercise device according to claim 1 wherein the command module is configured to calculate and continuously output in the form of the feedback signals to the communications module a temporal progress of the drive force and/or related torque on the basis of the measurements received from the measuring unit.

18. The stationary ergometric exercise device according to claim 1 wherein the measuring device for measuring cadence includes a pair of sensor pieces attached to the drive wheel and at least one sensor positioned in a stationary location relative to the drive wheel, the pair of sensor pieces being movable with the drive wheel relative to the at least one sensor on operation of the foot-operable drive by means of which each of the sensor pieces is detected passing the at least one sensor when the gear wheel is located at one of two specific angular positions, the positions being located 180° apart and corresponding to positions in motion of load alternation between the alternately operable drive elements.

19. The stationary ergometric exercise device according to claim 18 wherein the pair of sensor pieces include a magnet and the at least one sensor is a magnetic field sensor.

20. The stationary ergometric exercise device according to claim 18 wherein the command module is configured to receive signals from the measuring device identifying times of load alternation between the alternately operable drive elements and, using the times of load alternation identified by the measuring device, to apportion variables calculated on the basis of the measurements received from the measuring unit alternately to a right limb or left limb of a user.

21. The stationary ergometric exercise device according to claim 1 wherein the measuring device for measuring cadence includes a pair of sensors positioned in stationary locations relative to the drive wheel and at least one sensor piece attached to the drive wheel, the at least one sensor piece being movable with the drive wheel relative to the pair of sensors on operation of the foot-operable drive by means of which each of the sensors detects a passing sensor piece when the drive wheel is located at one of two specific angular positions, the positions being 180° apart and corresponding to positions in motion of load alternation between the alternately operable drive elements.

\* \* \* \* \*